Jan. 19, 1932.  M. CLAUDE  1,841,878
BLOWPIPE CUTTING APPARATUS
Filed Feb. 28, 1930
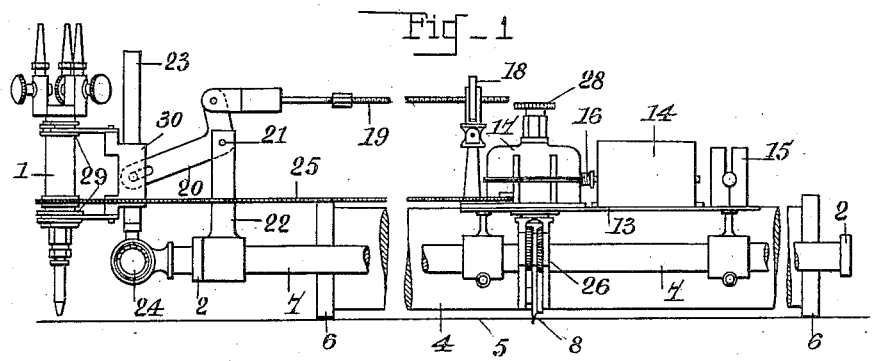
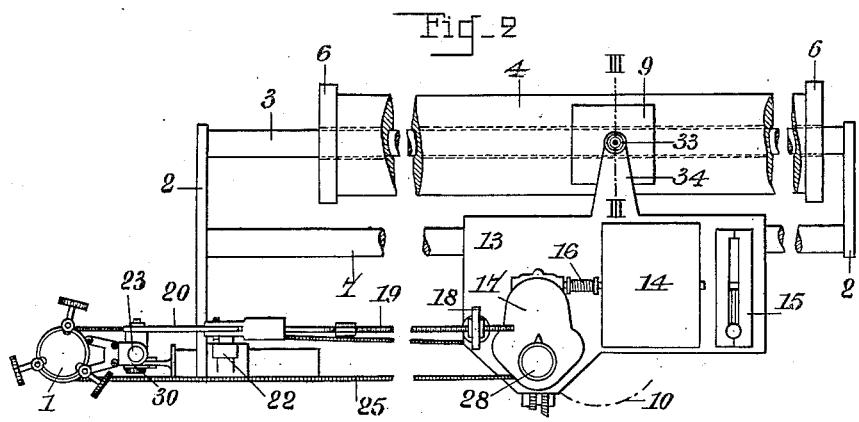
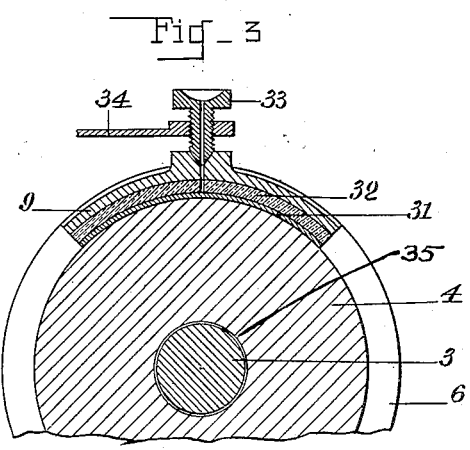
Inventor
Maurice Claude
By Langner Parry Card & Langner
Attys Patented Jan. 19, 1932

1,841,878

UNITED STATES PATENT OFFICE

MAURICE CLAUDE, OF BOULOGNE-SUR-SEINE, FRANCE

BLOWPIPE CUTTING APPARATUS

Application filed February 28, 1930, Serial No. 432,187, and in France March 5, 1929.

In known apparatus for the blowpipe cutting of metals, the blowpipe is mounted on a carriage movable on rails mounted on a second carriage rolling upon rails which are perpendicular to the first-mentioned rails and rest upon a support.

The present invention has for its object to obviate all such disposition of rails; herein the device comprises a mass of revolution (cylinder, cone, etc.) of a relatively large weight and rolling directly on the support; on this mass a rod is mounted slidable, which makes part of the frame supporting the blowpipe.

This disposition has another advantage, since it enables the use of the improvements specified in my Patent No. 1,802,237 of April 21, 1931.

In particular, the cylinder rolls upon the said support by means of two leather-faced rings of exactly equal diameter, and the speed of travel of the blowpipe is regulated by a piece of greasy leather secured to the blowpipe holder and mounted against the cylinder.

The accompanying drawings show by way of example a preferred means of realizing the present invention.

In the drawings,

Figure 1 shows a front elevational view,

Figure 2 is a plan view, and

Figure 3 is a partial cross-sectional view upon the section line III—III in Figure 2.

In the construction represented, the blowpipe 1 is mounted on a frame consisting of a parallelogram 2—3—7: one of the rods 3 is freely slidable in an axial bore 35 in a cylinder 4 adapted to roll upon the support 5 by means of two bearings 6 of exactly equal diameters. To increase the adhesion of the said cylinder 4 to the said support 5, the edges of said bearings 6 are faced with leather. On the rod 7 of the parallelogram and parallel to the rod 3, is mounted a milled wheel 8.

The rod 7 supports a platform 13 upon which is mounted an electric motor 14, regulated by a rheostat 15 and driving,—by a flexible power transmission device 16—a speed reducer 17. This latter actuates the milled wheel 8. The platform 13 also carries the device for the vertical adjustment of the blowpipe 1 by means of controlling nut 18 a threaded rod 19 and a bell-crank 20 pivoting on an axle 21 mounted on a bracket 22 secured to the rod 7. The speed of movement of the polished cylinder 4 is regularized according to my Patent No. 1,802,237 by means of an oil leather packing 31 cemented on a felt packing 32 itself affixed on a shoe 9. The latter is applied on the cylinder 4 regularly by a screw 33 which can screw in the threaded hole of a projecting part 34 integral with the platform 13.

The blowpipe 1 is supported by two collars 29 mounted on a bracket 30 slidable on a vertical axle 23 which is rotatable on a horizontal shaft 24.

A chain 25 serves to turn the blowpipe in the collars 29, as is required for instance when the blowpipe described is to be provided with the improvements specified in my patent No. 1,728,104 of September 10, 1929.

The operation is as follows:

The milled wheel 8, driven by the motor, is caused to follow the path 10 to be reproduced, which is drawn upon the support 5. The said milled wheel 8 is directed by means of a milled knob 28 secured to the bracket 26 carrying the said milled wheel. Each unit displacement of the wheel 8 may be considered as the sum of two units displacements whereof one is perpendicular to the axis of the cylinder 4 and the other is parallel to the said axis.

The first displacement causes a corresponding rolling motion of the cylinder 4, which can only be displaced, due to its weight and its adhesion to the support 5 and to the equal diameters of the bearings 6, in a direction which is exactly determined and is perpendicular to its axis. The second unit displacement parallel to the axis of the cylinder 4 takes place by the sliding of the rod 3 in the axial bore 35 of the cylinder 4. The two unit displacements are made regular by the said leather member 9, in conformity to the aforesaid application, which is movable along a circle or along a generatrix of cylinder 4. In reality, the said leather member moves on the cylinder 4 according to a continuous curve depending upon the outline to be reproduced.

The blowpipe will thus cut the object according to a curve which is in exact concordance with the pattern 10.

Having now particularly described and ascertained the nature of my invention and in what manner the same is to be performed, I declare that what I claim is:

1. A cutting apparatus comprising cutting means, a frame for supporting said cutting means, a cylinder of substantially great mass, driving means for said cylinder and said frame, and said frame and said cylinder being so interconnected as to provide means for controlling the movement of said frame relative to said cylinder along a predetermined path.

2. A cutting apparatus comprising cutting means, a frame supporting said cutting means, a cylinder of great mass, driving means for said cylinder and said frame, a guiding rod upon said frame upon which said cylinder is mounted, and regularizing means carried by said frame cooperating with said cylinder.

3. A cutting apparatus comprising cutting means, a frame for supporting said cutting means, a guiding rod upon said frame, a cylinder of great mass, driving means for said cylinder and said frame, and said cylinder having an axial bore through which said guiding rod passes.

4. A cutting apparatus comprising cutting means, a frame for supporting said cutting means, a cylinder of great mass, driving means for cylinder and said frame, said cylinder and frame being so interconnected as to provide means for controlling the movement of said frame relative to said cylinder along a predetermined path, a shoe comprising oiled leather, and means upon said frame for maintaining said shoe in contact with said cylinder.

5. A cutting apparatus comprising cutting means, a frame for supporting said cutting means, a cylinder of great mass, driving means for said frame and cylinder, said cylinder and frame being so interconnected as to provide means for controlling the movement of said frame relative to said cylinder along a predetermined path, and collars upon said cylinder adjacent the ends thereof of the same diameter.

6. A cutting apparatus comprising cutting means, a frame supporting said cutting means, a cylinder of great mass, driving means for said cylinder and said frame, said cylinder and frame being so interconnected as to provide means for controlling the movement of said frame relative to said cylinder and means for vertically adjusting said cutting means.

In testimony whereof I have signed this specification.

MAURICE CLAUDE.